(12) United States Patent
Barbeito

(10) Patent No.: US 11,268,498 B1
(45) Date of Patent: Mar. 8, 2022

(54) APPARATUS FOR CREATING CENTRIPETAL FORCE DIFFERENTIAL

(71) Applicant: Arturo Manuel Barbeito, Miami, FL (US)

(72) Inventor: Arturo Manuel Barbeito, Miami, FL (US)

( * ) Notice: Subject to any disclaimer, the term of this patent is extended or adjusted under 35 U.S.C. 154(b) by 0 days.

(21) Appl. No.: 17/393,043

(22) Filed: Aug. 3, 2021

(51) Int. Cl.
   *F03G 7/10* (2006.01)
   *F16H 25/14* (2006.01)

(52) U.S. Cl.
   CPC .............. *F03G 7/115* (2021.08); *F16H 25/14* (2013.01)

(58) Field of Classification Search
   CPC .................................. F03G 7/115; F16H 25/14
   See application file for complete search history.

(56) References Cited

U.S. PATENT DOCUMENTS

| | | | | |
|---|---|---|---|---|
| 947,226 | A * | 1/1910 | Dorfeel | F16H 25/14 74/55 |
| 1,445,474 | A * | 2/1923 | Benson | F16H 25/14 74/55 |
| 3,750,484 | A | 8/1973 | Benjamin | |
| 4,579,011 | A * | 4/1986 | Dobos | F03G 3/00 74/61 |
| 5,782,134 | A * | 7/1998 | Booden | F03G 3/00 310/81 |
| 6,089,511 | A | 7/2000 | Rasmusson | |
| 2005/0039556 | A1 | 2/2005 | Nowlan | |
| 2008/0000324 | A1* | 1/2008 | Biro | F03G 3/08 74/84 R |
| 2008/0168862 | A1 | 7/2008 | Walden | |
| 2019/0277378 | A1 | 9/2019 | Bronson | |

* cited by examiner

*Primary Examiner* — Terence Boes
(74) *Attorney, Agent, or Firm* — The Concept Law Group, PA; Scott D. Smiley; Scott M. Garrett

(57) ABSTRACT

A system for producing a relative centripetal force differential includes a turntable having a plurality of telescoping spoke elements arranged along radial lines around the center of the turntable. Each of the spoke elements has a fixed end attached to the turntable and a moveable free end opposite the fixed end. As the turntable is rotated the free end of each spoke elements is moved such that it is at a minimum distance through a minimum distance region, at a maximum distance through a maximum distance region that is opposite the minimum distance region, and increased or decreased through transition regions on either side of the minimum and maximum distance regions.

20 Claims, 12 Drawing Sheets

PRIOR ART

APPARATUS FOR CREATING CENTRIPETAL FORCE DIFFERENTIAL

FIELD OF THE INVENTION

The present invention relates generally to machine systems for creating a centripetal force differential, and more particularly to a rotating system that uses a combination of permanent and electromagnets to oppose the outward force of magnetic masses being rotated around an eccentric path.

BACKGROUND OF THE INVENTION

Centripetal force results when a mass is rotated about an axis, at a distance from the axis. The centripetal force acts to counter the tendency of the mass to move in straight line, resulting in the mass following the curve around the axis of rotation. Understanding centripetal force is critical to many scientific and engineering endeavors. While centripetal force is relatively simple to understand when considering a perfectly circular path of rotation, the effects of imbalance are not as intuitively understood.

One example of an imbalance system is an eccentric cam commonly used in mobile communication devices to create vibration. The eccentric cam is mounted on the spindle of a small electric motor. To create vibration, the motor is actuated and the cam is rotated about the spindle. Due to there being more mass on one side of the cam, there is an imbalance in centripetal force as the cam rotates about the motor's spindle, resulting in vibration. The vibration results from the force imbalance created by the rotation. The magnitude of the force in a rotating system is dependent on both the mass being rotated, as well as the angular velocity. Of course, the eccentricity producing the imbalance is constantly circulating about the motor to create the vibration and the longer lobe of the cam created more centripetal force than the opposing side.

Studying the effect of centripetal force is typically limited to eccentric rotating masses like an eccentric cam, or the classic "figure skater" effect in which masses are pulled in or extended relative to an axis of rotation to see the effect on angular velocity and the conservation of angular momentum. However few devices or systems are available to demonstrate the effect of a fixed eccentric rotation path, where the eccentricity is fixed relative to the center of rotation, while the rotating portion rotates and changes length according to its position of rotation. This creates a fixed centripetal force differential that is useful for demonstrating various physical phenomena, including the laws of motion, energy, and thermodynamics.

Therefore, a need exists to overcome the problems with the prior art as discussed above.

SUMMARY OF THE INVENTION

In accordance with some embodiments of the inventive disclosure, there is provided a system for creating a centripetal force differential. The system includes a turntable defining a plane and having a center, wherein the turntable rotates about the center such than an axis of rotation passing through the center is normal to the plane defined by the turntable. The system further includes a plurality of spoke elements arranged on the turntable radially and symmetrically around the axis of rotation, each one of the plurality of spoke elements having a fixed end adjacent the center of the turntable and a free end opposite the fixed end, wherein the free end is moveable between a minimum radial distance and a maximum radial distance. A region around the turntable is defined into a minimum radial distance region where the free end of each one of the plurality of spoke elements is controlled to be at the minimum radial distance as the spoke element passes through the minimum radial distance region. The region also includes a maximum radial distance region that is opposite the minimum radial distance region relative to the center of the turntable and where the free end of each one of the plurality of spoke elements is controlled to be at the maximum radial distance as the spoke element passes through the maximum radial distance region. The region further includes a first transition region between minimum radial distance region and the maximum radial distance region on a first side where the free end of each one of the plurality of spoke elements is controlled to be transition from the minimum radial distance to the maximum radial distance as the spoke element passes through the first transition region. The region also includes a second transition region between the minimum radial distance region and the maximum radial distance region on a second side where the free end of each one of the plurality of spoke elements is from the maximum radial distance to the minimum radial distance as the spoke element passes through the first transition region and immediately after passing through the maximum radial distance region. The system further includes a motor connected to the turntable on the axis of rotation that is configured to rotate the turntable and the plurality of spoke elements, wherein each spoke element is operable to adjust its length as it rotates through the minimum radial distance region, first transition region, maximum radial distance region, and second transition region with each rotation of the turntable.

In accordance with a further feature,

In accordance with a further feature, the system further includes a plurality of magnetic elements disposed on a frame about the minimum radial distance region, maximum radial distance region, first transition region and second transition region. Each one of the plurality of spoke elements includes a permanent magnet at the free end, and wherein a magnetic field of the permanent magnet opposes a magnetic field of each of the magnetic elements such that a magnetic repulsion between the permanent magnet at the free end of each one of the plurality of spoke elements is selected to control the length of each one of the plurality of spoke elements.

In accordance with a further feature, the magnetic elements in the minimal radial distance region and the maximum radial distance region are permanent magnets, and the magnetic elements in the first transition region and the second transition region are electromagnets. The system further includes a distributor that provides current pulses to each of the electromagnets in synchronization with the rotation of the turntable.

In accordance with a further feature, each of the plurality of spoke elements includes a linear thruster that is operated to move a free end of the spoke element as the turntable rotates.

In accordance with a further feature, the plurality of spoke elements includes a top set of spoke elements on a top of the turntable, and a bottom set of spoke elements on a bottom of the turntable.

In accordance with a further feature, the plurality of spoke elements comprises four pairs of opposing spoke elements.

In accordance with a further feature, each one of the plurality of spoke elements includes, at the free end, a roller that engages a frame edge of a frame around the turntable.

In accordance with a further feature, the roller is mounted on a spring coupled to the spoke element.

In accordance with a further feature, each one of the plurality of spoke elements is a telescoping spoke element having a plurality of telescoping sections.

In accordance with a further feature, the system further includes a frame around the turntable, the frame having an upper frame member, a lower frame member, and a middle sidewall section between the upper and lower frame members, the turntable being mounted between the upper and lower frame members.

In accordance with some embodiments of the inventive disclosure, there is provided an apparatus for creating a relative centripetal force differential that includes a turntable that rotates in a plane about a center of the turntable and a plurality of spoke elements mounted on the turntable. The plurality of spoke elements being arranged in opposing pairs about the center of the turntable, each one of the plurality of spoke elements having a fixed end adjacent the center of the turntable and a free end opposite the fixed end along a radial line from the center of the turntable, and wherein the free end is moveable relative to the fixed end along the radial line between at least a minimum distance and a maximum distance. The apparatus also includes a motor coupled to the turntable to rotate the turntable. As the turntable is rotated, a length of each one of the plurality of spoke elements is controlled to be at the minimum distance while passing through a minimum distance region about the turntable, wherein the minimum distance region is defined over approximately one hundred and eighty degrees of a rotation of the turntable in a region about the turntable. The length is further controlled to be at the maximum distance while passing through a maximum distance region that is directly opposite the minimum distance region and which is defined over about sixty degrees of rotation. The length is further controlled to be increasing from the minimum distance to the maximum distance through a first transition region defined over about sixty degrees of rotation between the minimum distance region and the maximum distance region on a first side of the turntable. The length is further controlled to be decreasing from the maximum distance to the minimum distance through a second transition region defined over about sixty degrees of rotation between the maximum distance region and the minimum distance region on a second side of the turntable.

In accordance with a further feature, the apparatus further includes a plurality of magnetic elements disposed on a frame about the minimum distance region, maximum distance region, first transition region and second transition region. The apparatus also includes each one of the plurality of spoke elements having a permanent magnet at the free end, and wherein a magnetic field of the permanent magnet opposes a magnetic field of each of the magnetic elements such that a magnetic repulsion between the permanent magnet at the free end of each one of the plurality of spoke elements is selected to control the length of each one of the plurality of spoke elements.

In accordance with a further feature, the magnetic elements in the minimal distance region and the maximum distance region are permanent magnets, and the magnetic elements in the first transition region and the second transition region are electromagnets. The apparatus further including a distributor that provides current pulses to each of the electromagnets in synchronization with the rotation of the turntable.

In accordance with a further feature, each of the spoke elements include a linear thruster that is operated to move a free end of the spoke element as the turntable rotates.

In accordance with a further feature, the plurality of spoke elements includes a top set of spoke elements on a top of the turntable, and a bottom set of spoke elements on a bottom of the turntable.

In accordance with a further feature, the plurality of spoke elements comprises four pairs of opposing spoke elements.

In accordance with a further feature, each one of the plurality of spoke elements includes, at the free end, a roller that engages a frame edge of a frame around the turntable.

In accordance with a further feature, the roller is mounted on a spring coupled to the spoke element.

In accordance with a further feature, each one of the plurality of spoke elements is a telescoping spoke element having a plurality of telescoping sections.

In accordance with some embodiments of the inventive disclosure, there is provided a method of creating a centripetal force differential that includes providing a turntable that is able to rotate about a center, a plurality of spoke elements mounted on the turntable that are arranged in opposing pairs about the center. Each one of the plurality of spoke elements being telescoping and having a fixed end mounted on the turntable adjacent the center, and a free end opposite the fixed end along a radial line from the center and moveable between a minimum distance and a maximum distance. The method further includes defining, around the turntable, a plurality of regions of rotation about the center, including a minimum distance region defined over approximately one hundred eighty degrees around the center, a maximum distance region directly opposite the minimum distance region and defined over approximately sixty degrees about the center, a first transition region defined over approximately sixty degrees between the minimum distance region and the maximum distance region on a first side of the minimum and maximum distance regions, and a second transition region defined over approximately sixty degrees between the maximum distance region and the minimum distance region on a second side of the minimum and maximum distance regions. The method further includes rotating the turntable, and while rotating the turntable, controlling each one of the plurality of spoke elements such the free end of each one of the plurality of spoke elements is at the minimum distance as the spoke element rotates through the minimum distance region, increased from the minimum distance to the maximum distance as the spoke element rotates through the first transition region, at the maximum distance as the spoke element rotates through the maximum distance region, and decreased from the maximum distance to the minimum distance as the spoke element rotates through the second transition region.

Although the invention is illustrated and described herein as embodied in a system, apparatus, and method for producing a differential centripetal force, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the spoke elements. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
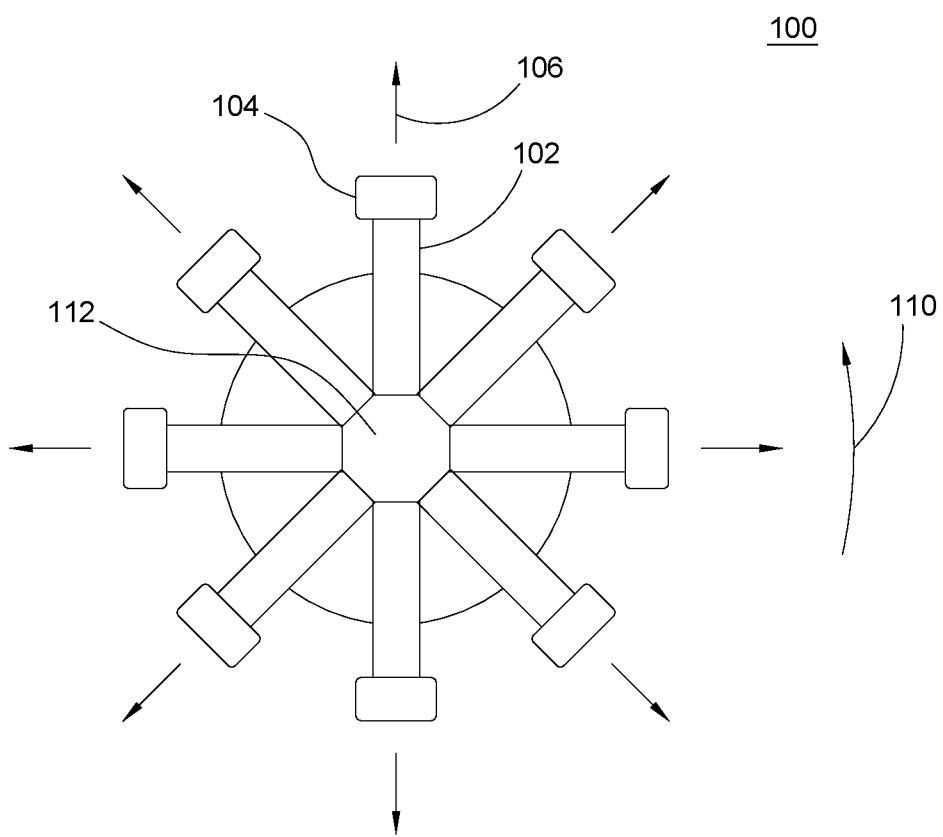
FIG. 1 is an overhead plan view of a device for generating centripetal forces, in accordance with the prior art.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

FIG. 1 is an overhead plan view of a prior art device 100 for generating centripetal forces, in accordance with the prior art. The device 100 includes several spoke elements 102 that extend radially from an axis of rotation 112. At the end of each spoke element is a mass 104. The spoke elements 102 all have the same fixed length, and the mass of each of the masses 104 are identical and they have the same dimensions. Accordingly, the centripetal force acting on each mass 104 is identical. The spoke elements 102 are rotated about the axis 112, as indicated by arrow 110, each mass 104 results in a centripetal force radially outward from the axis 112, as indicated by arrow 106 for a given point in time. The force is countered by the spoke elements 102 holding each mass 104, and as a result, each mass 104 follows a circular orbit around the axis 112, rather than continuing in a straight line, as would happen if, for example, a mass 104 detached from its respective spoke element 102. When each mass 104 has the same magnitude, and are each located the same distance from the axis 112, the centripetal force of once mass acting at the axis 112 is essentially cancelled by an opposing spoke element 102 and mass 104. However, if one of the masses is made heavier, or lighter, than its opposing mass element, then an imbalance will occur during rotation of the device. Likewise, if one spoke element is made longer, or shorter, than its opposing spoke element, than an imbalance in forces will occur upon commencing rotation. If there is an imbalance, the net force will be off center (i.e. not on axis 112), and the device will be pulled in the direction of the imbalanced element during rotation, which can produce vibration.

Figure 2:
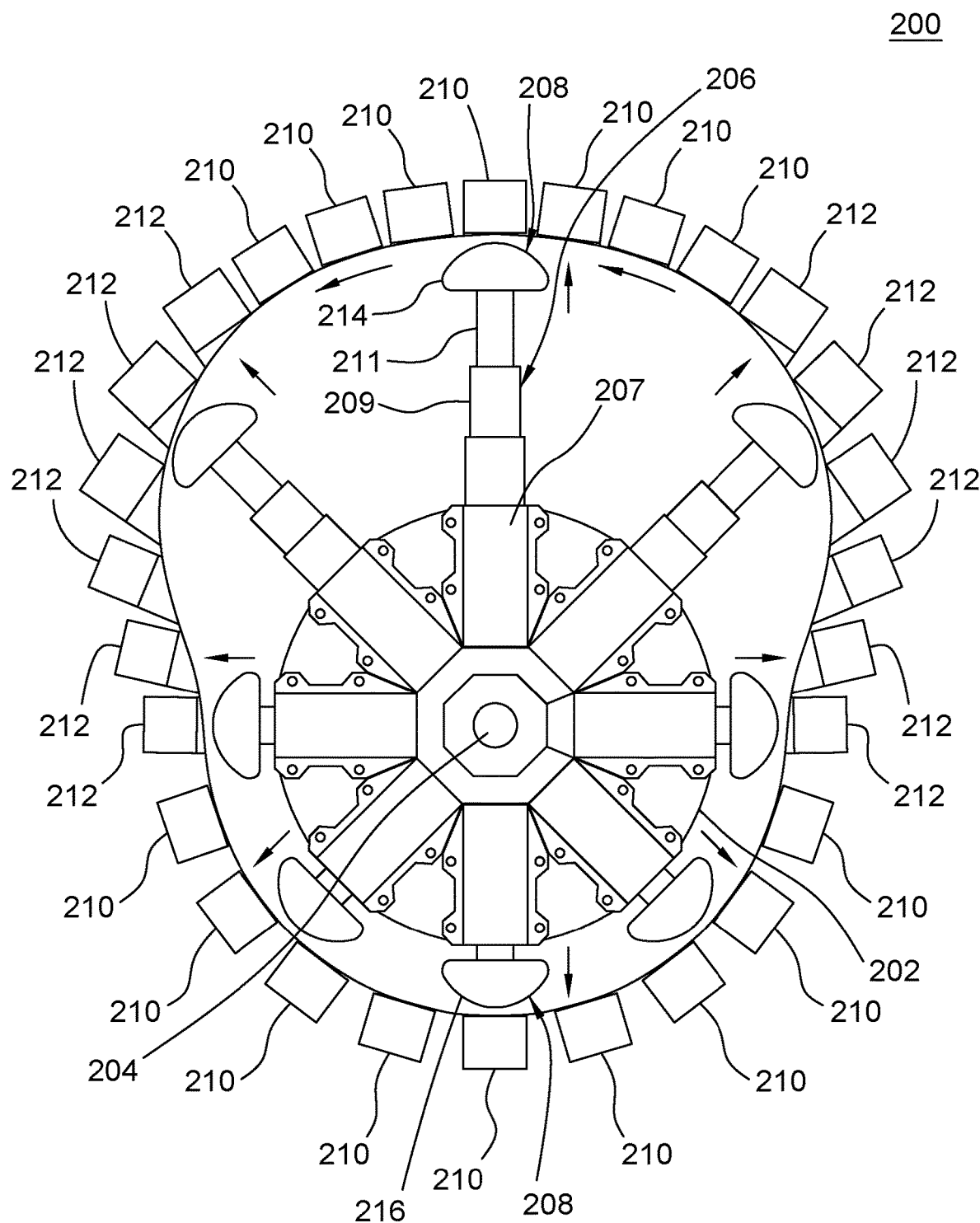
FIG. 2 is an overhead plan view of a device for generating differential centripetal forces, in accordance with some embodiments.

FIG. 2 is an overhead plan view of a device 200 for generating a differential centripetal force, in accordance with some embodiments. Specifically, the device 200 produces a force offset that is in a fixed location relative to the axis of rotation, and that is independent of the rotating elements. A turntable 202 is generally round, and defines a plane, which, as shown in this drawing would be parallel with the plane of the drawing sheet. The turntable 202 has a center through which an axis of rotation 204 passes perpendicularly to the plane of the turntable 202. A drive shaft is coupled to the turntable 202 along the axis 204 so that turning the drive shaft causes the turntable 202 to turn in correspondence with the drive shaft. Mounted on the turntable 202 are a plurality of telescoping spoke elements 206. The spoke elements 206 each have a first end located near the axis of rotation, and an elongated body aligned radially on the turntable 202 with respect to the axis of rotation. As shown here there are four pairs of opposing spoke elements 206.

Each one of the spoke elements 206 are telescoping, meaning that they have a base portion 207 mounted and fixed to the turntable 202, and at least one moveable portion that moves relative to the base portion along a radial line extending outward from the axis of rotation 204. As shown here, each spoke element 206 has a base portion 207, an intermediate telescoping section 209, and a distal telescoping section 211 that has a mass 208 at a distal end that is furthest from the axis of rotation 204. The intermediate and distal sections 209, 211 slide or otherwise move relative to each other and the base section 207, and nest into each other. A roller and track arrangement can be used such that, for example, intermediate section 209 is mounted on rollers that roll on a track on the inside of base section 207, and the distal section 211 can have a similar interconnection with the intermediate section 209. Accordingly, when the turntable 202 rotates, the telescoping sections (e.g. 209, 211) will be urged outward in response to centripetal force. The end of the distal section 211 includes a mass 208 comprised of a permanent magnet that further increases the effect of centripetal force.

Surrounding the turntable 202 in an eccentric shape and mounted on a frame around the turntable 202 are a plurality of magnetic elements including permanent magnets 210 and electromagnets 212. The eccentric shape includes a semicircle around the turntable on one side at a constant radius relative to the axis of rotation 204, On the other side of the turntable the magnetic elements follow a non-circular path, having an arcuate portion at a greater distance from the axis of rotation 204 and transition sections. The magnetic elements are arrange to have an opposing polarity to the permanent magnets 208 on the distal ends of each of the telescoping spoke elements 206. The magnetic force (repulsion) of the magnetic elements is selected to equal, and cancel the centripetal force acting on the permanent magnets 208 at a selected angular velocity of the turntable 202. Thus, as the turntable 202 rotates, centripetal force urges the permanent magnets 208 on each spoke element outward, away from the axis of rotation 204. The magnetic repulsive force created between the permanent magnets 208 and the magnetic elements 210, 212 as the permanent magnets 208 pass by the magnetic elements 210, 212 opposes and cancels the effect of the centripetal force acting on the permanent magnet 208. Where the magnetic elements 210, 212 are farther from the axis of rotation, the telescoping arrangement of the spoke elements 206 allow the permanent magnets to extend farther from the axis of rotation 204. Since all the permanent magnets 208 are moving at the same angular velocity, those that are farther away from the axis of rotation experience great centripetal force and as a result exert more force on the magnetic elements 210, 212 as the permanent magnets 208 pass by. Thus, is the specific arrangement shown in FIG. 2, assuming the turntable were in motion and turning, permanent magnet 214 is subject to more centripetal force than permanent magnet 216 which is opposite the axis of rotation 204 and traveling at a shorter distance from the axis of rotation 204. Accordingly, more force is exerted on the magnetic element proximate to permanent magnet 214 that to the magnetic element proximate to permanent magnet 216, if the magnetic elements are configured to fully repel the passing permanent magnets 208. The magnetic elements 210, 212 are configured or selected to control the extension of the free end of the spoke elements as they pass by the magnetic elements 210, 212.

Of the magnetic elements 210, 212, the permanent magnets 210 are selected to have a magnetic field strength sufficient to oppose the centripetal force exerted on the permanent magnets 208, and are used on the regions having a substantially constant radius from the axis of rotation 204. Electromagnets 212 are used in the transition regions where the radius to the axis of rotation 204 changes along the region. The electromagnets 212 are turned on as each permanent magnet 208 approaches and passes to produce a repulsive magnetic field that can vary with the angular velocity of the turntable 204. The magnetic elements 210, 212 are oriented to face the axis of rotation, although at the start of a decreasing radius transition zone the a magnetic element can be angled slightly away from the axis of rotation 204.

Figure 3:
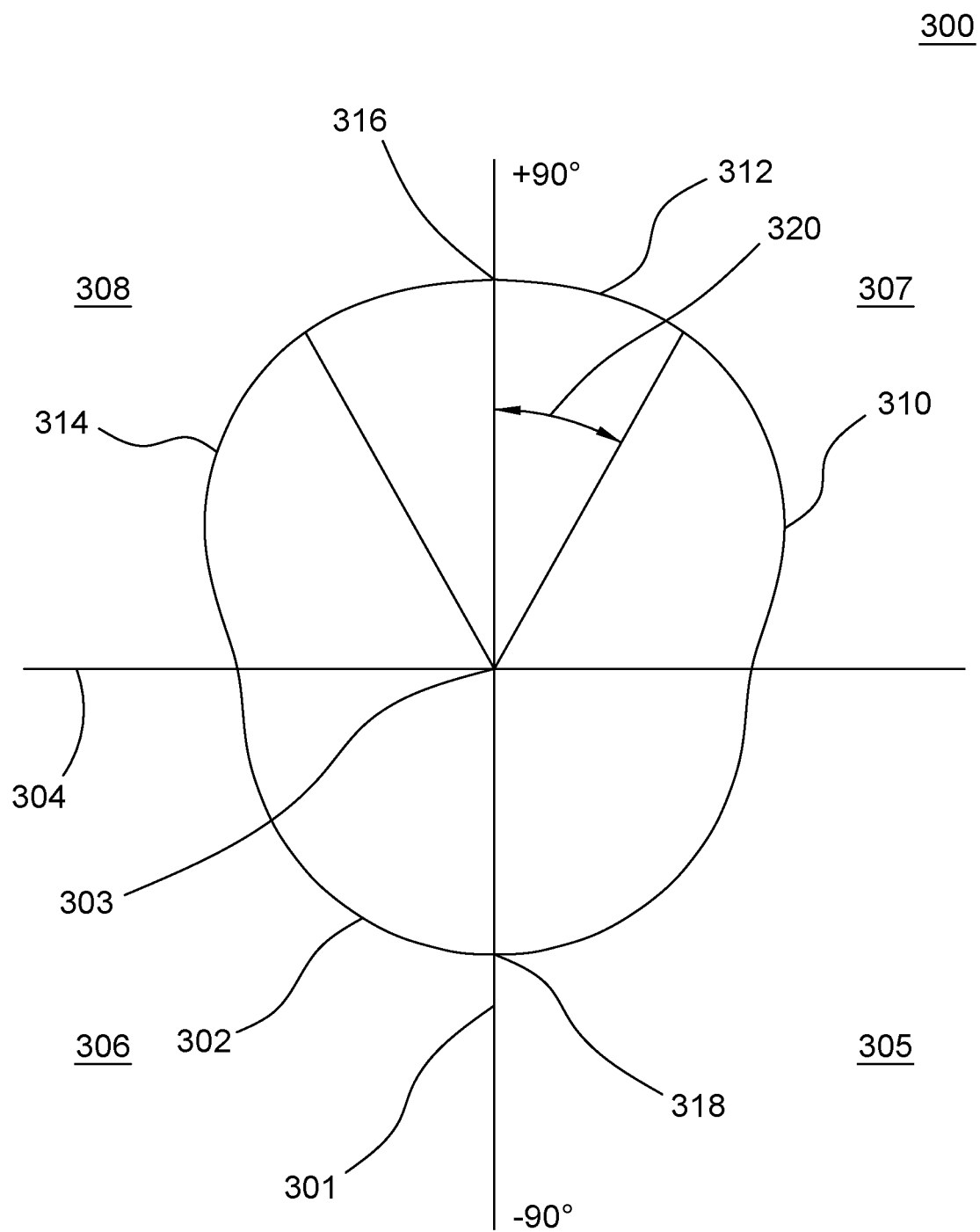
FIG. 3 is a diagram of an eccentric path about an axis of rotation followed by masses being rotated about the axis, in accordance with some embodiments.

FIG. 3 is a diagram of an eccentric path 300 about an axis of rotation (e.g. 204) followed by masses being rotated about the axis, as in FIG. 2, in accordance with some embodiments. The path is mapped over a vertical axis 301 and a horizontal axis 304 that is perpendicular to the vertical axis 301. The axes 301, 304 produce four quadrants including a first quadrant 307, a second quadrant 308, a third quadrant 306, and a fourth quadrant 305. The path 300 follows a semicircle 302 in the third and fourth quadrants 306, 305, having a radius 318 from the center 303 where the axes 301, 304 meet, representing the axis of rotation (e.g. 204). Thus, the semicircle 302 is the same distance away from the center 303 everywhere in the third and fourth quadrants 306, 305, and is a minimum radial distance region, or simply a minimum distance region. In the minimum distance region of the semicircle 302 the spoke elements are in a minimum distance configuration, meaning their free end is fully withdrawn with respect to the center 303 of rotation (e.g. the center of the turntable). The minimum distance region is defined over about one hundred eighty degrees of rotation, +/−3%.

In the first quadrant 307, the path follows a first transition region or first transition section 310 where, assuming a counter-clockwise direction of travel about the center 303, the radius from the center increases to an arcuate section 312 that can have a radius that is greater than that of the semicircle 302. In the first transition region 310 the free end of each spoke element is controlled to extend, increasing the length from the minimum distance to the maximum distance. The maximum distance region 312 directly opposes the minimum distance region of the semicircle 302. In the maximum distance region 312 the spoke elements are controlled to have their free end at a maximum distance from the center 303. That is, the free end of the spoke elements as they rotate through the maximum distance region is constant and at the maximum extension or distance. The first transition section 310 is on a first side of the maximum and minimum distance regions (e.g. 312 and 302) and extends through a portion of the first quadrant 307, such as approximately sixty degrees from the horizontal axis 304. The maximum distance region 312 can have a constant radius along its length from about thirty degrees on either side of the vertical axis 301, or about 60 degrees of rotation. In some embodiments the maximum distance region 312 can have varying distance from the center 303 with a peak radius from the center 303 at the top 316. A second transition section 314 is on a second side of the maximum and minimum distance regions. In the second transition region 314 the free end of the spoke elements is controlled to decrease from the maximum distance to the minimum distance. The second transition region 314 can be defined over about sixty degrees of rotation about the center 303. Accordingly, as the permanent magnets 208 are rotated, they experience different magnitudes of centripetal force depending on where they are located relative to the center 303 (e.g. their distance), and the centripetal force is proportional to the their distance from the center 303 and the rotation velocity. When the magnetic elements 210, 212 are provided along the eccentric rotation path, the force is transferred to those magnetic elements 210, 212. As can be seen here, the rotation path is symmetric about the "y" axis 316, and asymmetric about the "x" axis 304, resulting in an eccentric rotation path for the free ends of the spoke elements. While the turntable is rotated, the various regions are defined in fixed positions about the center 303.

Figure 4:
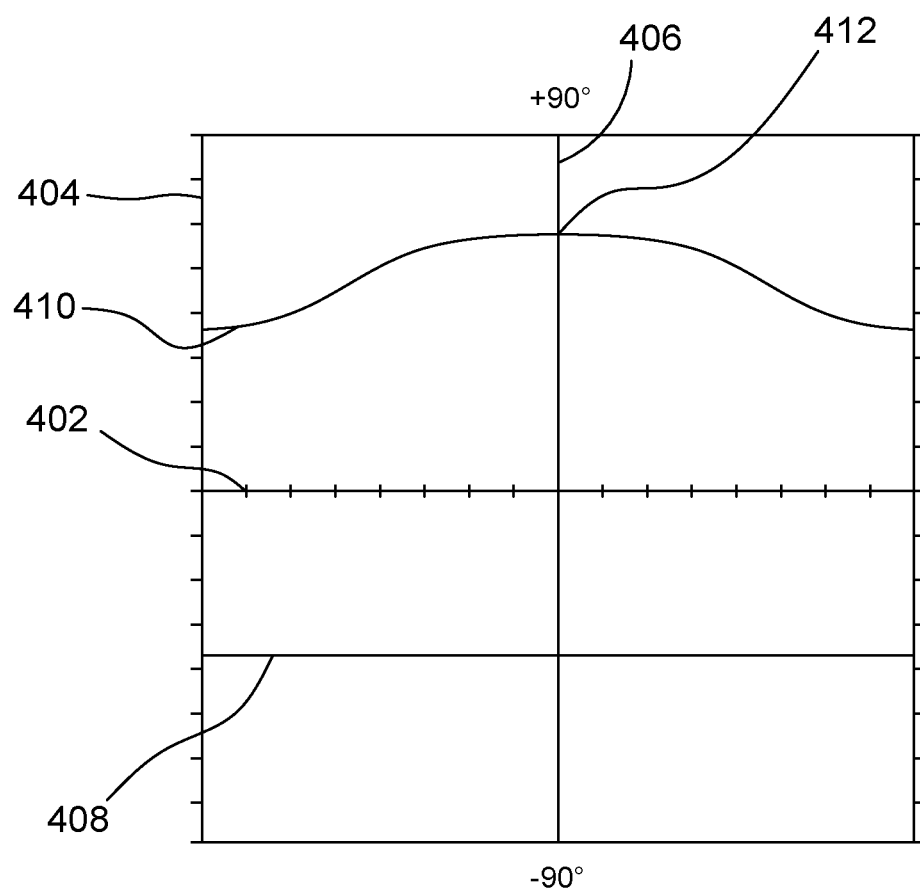
FIG. 4 is a chart of the force experienced by masses being rotated around an eccentric path, in accordance with some embodiments.

FIG. 4 is a chart 400 of the force experienced by masses being rotated around an eccentric path, in accordance with some embodiments. In particular, the path can be that shown in FIGS. 2 & 3. The chart 400 shows a horizontal axis 402 and a vertical axis 404. The horizontal axis indicates the angle of rotation, while the vertical axis 404 indicates the relative magnitude of the force created by rotation. The chart has four quadrants corresponding to the four quadrants of FIG. 3. Thus, in the third and fourth quadrants, along the semicircle, because the radius is constant, the force acting on a mass being rotated along the semicircle is constant, as indicated by line 408. The magnitude of the force is represented by the distance from the horizontal axis 402. The side (above or below) the horizontal axis 402 does not matter as all centripetal force is radial. The chart 400 separates the force in the first and second quadrants (above the horizontal axis 402) from that of the third and fourth quadrants (below the horizontal axis 402). In the first and second quadrants, the centripetal force experienced by a mass rotating along the path 300 is represented by line 410, which varies because the radial distance of the mass (e.g. permanent magnet 208) from the center of rotation varies through these quadrants, and has a peak 412 at about ninety degrees, represented by the vertical line 406. As can be seen, a force differential is created. The effect is not unlike that created by an eccentric cam rotating about an axis, with the exception that the eccentricity is fixed relative to the surrounding environment, and the mass being rotated moves along an eccentric path. The force resulting from the centripetal action is transferred to the magnetic elements 210, 212 that are fixed on a structure surrounding the path and turntable, and on which the turntable 202 is mounted. The force resulting from the permanent magnets 208 being rotated along the eccentric path can be measured at each of the magnetic elements 210, 212, using, for example a strain gauge, to demonstrate the different force exerted at the various locations around the eccentric path.

Figure 9:
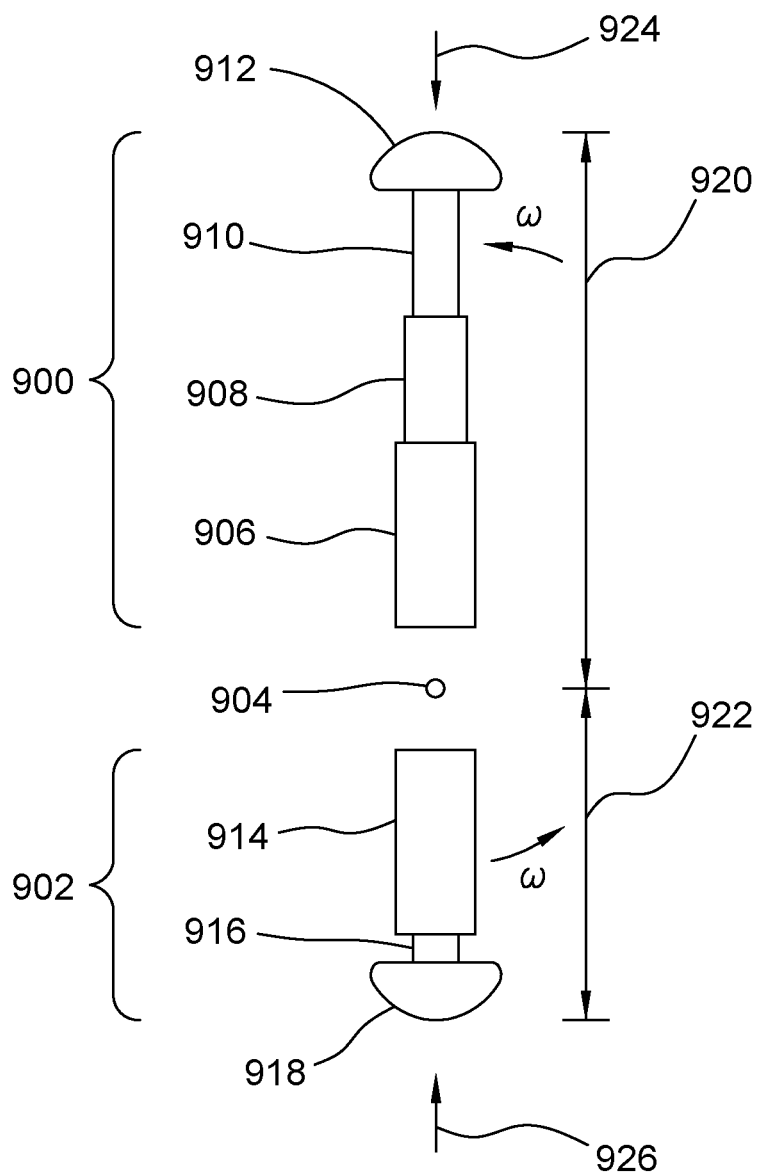
FIG. 9 shows an example of peak differential between opposing spoke members, in accordance with some embodiments.

In the embodiment of FIG. 2, there are shown eight spoke elements 206 arrange in four opposing pairs. FIG. 9 shows an example of one opposing pair of spoke elements 206. A first spoke element 900 is shown in an extended configuration, and opposite a second spoke element 902 in a collapsed configuration. The first spoke element 900 can be, for example, at the +90° position (e.g. 316 of FIG. 3) of the eccentric path, and the second spoke element would therefore be in the −90° position (e.g. 318 of FIG. 3) of the eccentric path. The first spoke element 900 includes a base section 906, and intermediate telescoping section 908, and a distal telescoping section 910. At the distal end of the distal telescoping section 910 is a permanent magnet 912. Likewise, the second spoke element 902 includes a base section 914, in which the intermediate section is fully collapsed (and not shown) into the base section 914, and the distal section 916 is mostly, if not fully collapsed into the base section 914. The distal section 916 is partially shown here only to indicate it exists, and not to show a definite position of the section as it would be in actual operation. At the distal end of the distal section 916 is a permanent magnet 918. The first spoke element 900 is arranged in opposition to the second spoke element 902 about an axis of rotation 904. Both of the spoke elements 900, 902 are arranged along opposing radial lines extending outward from the axis of rotation 904. The rotation about the axis of rotation 904 occur in the plane of the drawing, and at an angular velocity ω. Given the positions of the spoke elements 900, 902 relative to the eccentric path, the first spoke element 900 is extended fully and places the permanent magnet 912 at a distance 920 from the axis of rotation 904. The second spoke element 902 is collapsed fully and places the permanent magnet 918 at a distance 922 from the axis of rotation 904, where distance 920 is significantly greater than distance 922. Since both permanent magnets 912, 918 are moving at the same angular velocity, and assuming permanent magnets 912, 918 have the same mass, the first 924 acting on permanent magnet 912 will be greater than the force 926 acting on permanent magnet 918 during rotation. As a result, the net force from the perspective of the axis of rotation 904 will be in the direction of the first spoke element 900.

Figure 10:
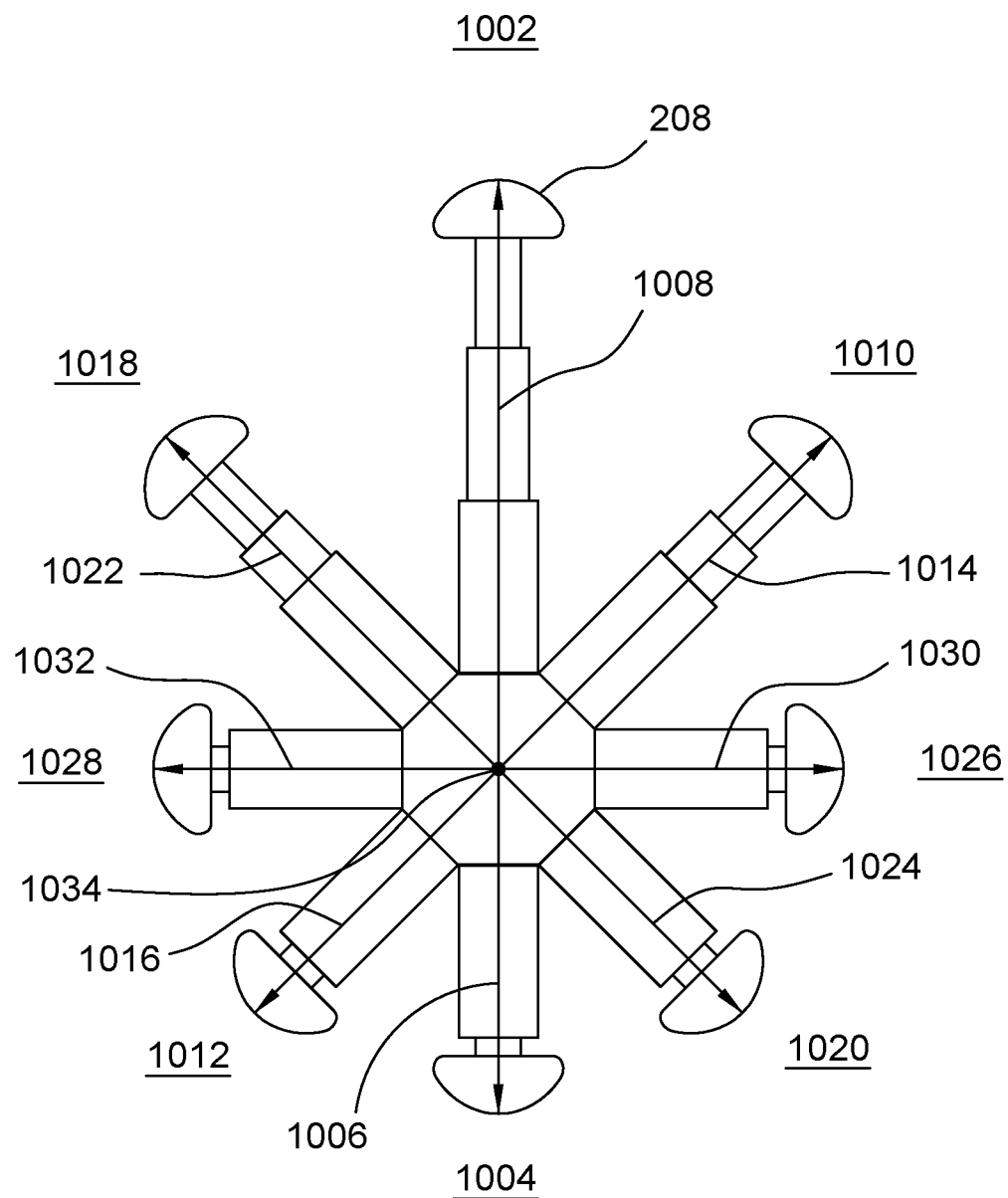
FIG. 10 shows a plurality of telescoping spoke elements arranged in opposing pairs relative to an axis of rotation, in accordance with some embodiments.

FIG. 10 show an arrangement of eight spoke elements arranged in opposing pairs, which could be projected onto the eccentric path of FIG. 3. Thus, the spoke element at position 1002 on radial line 1008 opposes the spoke element at position 1004 along radial line 1006. The spoke element at position 1010 on radial line 1014 opposes the spoke element at position 1012 along radial line 1016. The spoke element at position 1018 on radial line 1022 opposes the spoke element at position 1020 along radial line 1024. The spoke element at position 1026 on radial line 1030 opposes the spoke element at position 1028 along radial line 1032. Each of the spoke elements are telescoping spoke elements having a permanent magnet 208 at their distal end, and all of the permanent magnets have substantially the same mass. The spoke elements at positions 1004, 1012, 1020, 1026, and 1028 are all in their fully collapsed (shortest) configuration. Assuming the view shown in FIG. 10 is a moment during rotation of the spoke elements about the axis of rotation 1034, all of the permanent magnets 208 will experience centripetal force that results in the permanent magnets following the eccentric path. The vector of the force acting on each permanent magnet changes as it move in direction and magnitude. In the prior art arrangement of FIG. 1, the force is provided by the arms of the spokes pulling against the 102 the mass 104.

In the inventive arrangement of FIG. 2, as illustration also here in FIG. 10, the force is provided by magnetic repulsion between the permanent magnetic masses on the spoke elements and the magnetic elements positioned around the eccentric path. The apparatus of FIG. 2 demonstrates, within the appropriate reference frame, how a net force imbalance occurs over an eccentric path of rotation. For example, at positions 1026 and 1028, the opposing spoke elements are fully collapsed, or otherwise in a configuration such that the masses at the ends of the spoke elements are equidistant from the axis of rotation 1034. As a result, the forces acting on the masses (i.e. the permanent magnets) at these positions are equal, and opposite, cancelling each other out. At positions 1010 and 1012, and likewise at positions 1018 and 1020, the masses at positions 1010 and 1018 are located farther from the axis of rotation 1034 than are their opposing masses at positions 1012 and 1020. As a result, there will be greater force acting on the masses at positions 1010 and 1018 than there are on those masses at positions 1012 and 1020. Although these forces will be directed along the respective radial lines 1014, 1022, and 1016, 1024, these forces can be decomposed into components along perpendicular axes through the axis of rotation 1034, with a "y" axis running through positions 1002 and 1004 and the perpendicular "x" running through positions 1026 and 1028. Since the forces at positions 1010, 1018 are greater than those at positions 1012, 1020, there is a net force along the "y" axis. The same is true of the masses at positions 1002 and 1004, except these masses have no force component in the "x" axis at the moment that are at positions 1002, 1004, there is only a net force along the "y" axis. As the spoke elements are rotated, following the eccentric path, there will always be a force differential relative to the axis of rotation 1034 with a net force offset that is located along the "y" axis. These forces can measured, for example, at each of the magnetic elements 210, 212 and compared to demonstrate the effect of rotating opposing masses along an eccentric or offset path relative to the axis of rotation. This assumes, of course, that the magnetic elements 210, 212 are fixed in position relative to the axis of rotation, and the turntable 202. That means the structure holding the turntable 202 is fixed to the structure holding the magnetic elements. As described herein, the "net force" is with respect to the masses being rotated. Of course, other reactive forces occur in the overall system.

Figure 5:
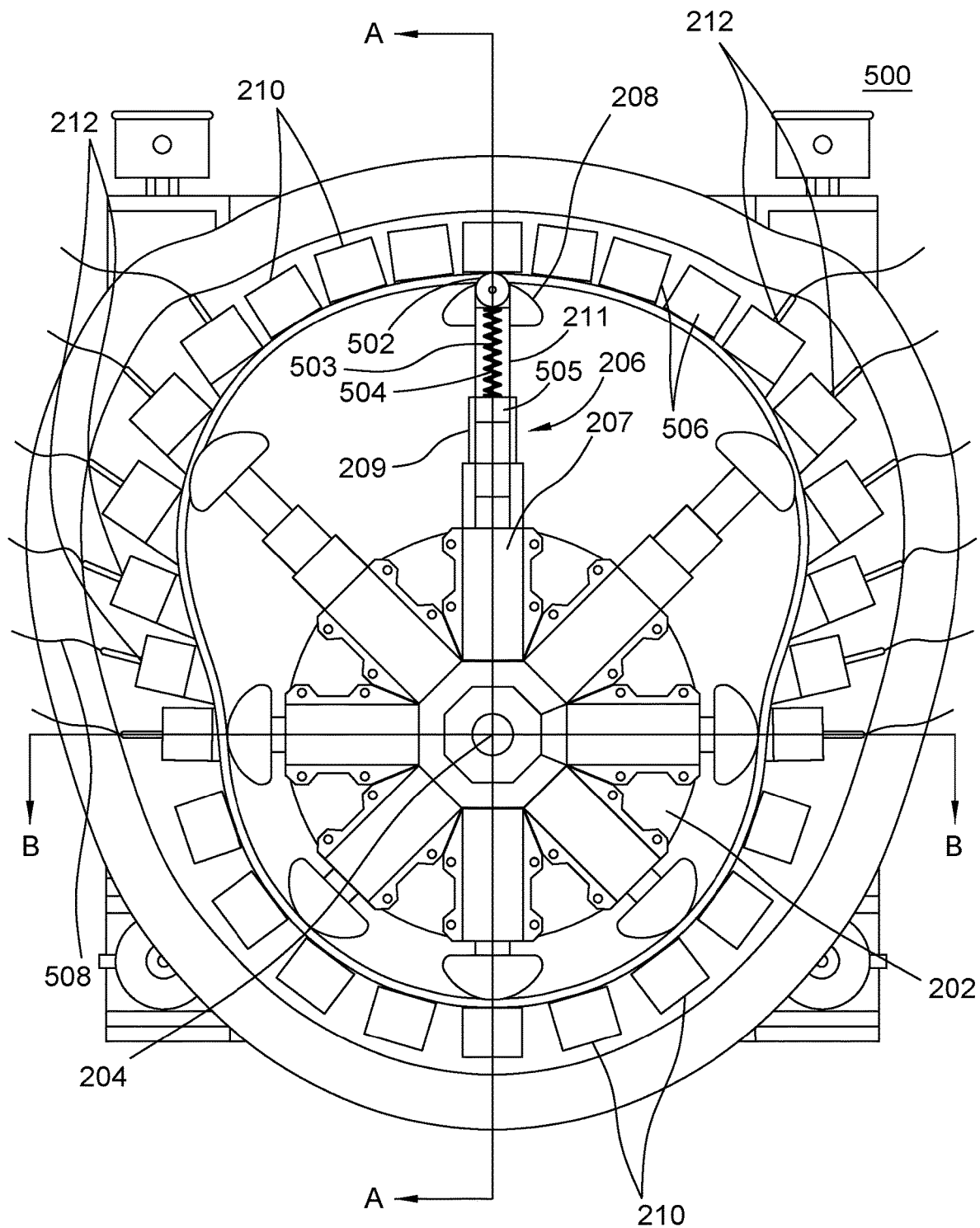
FIG. 5 is an overhead plan view of a device for generating differential centripetal forces, in accordance with some embodiments.
Figure 6:
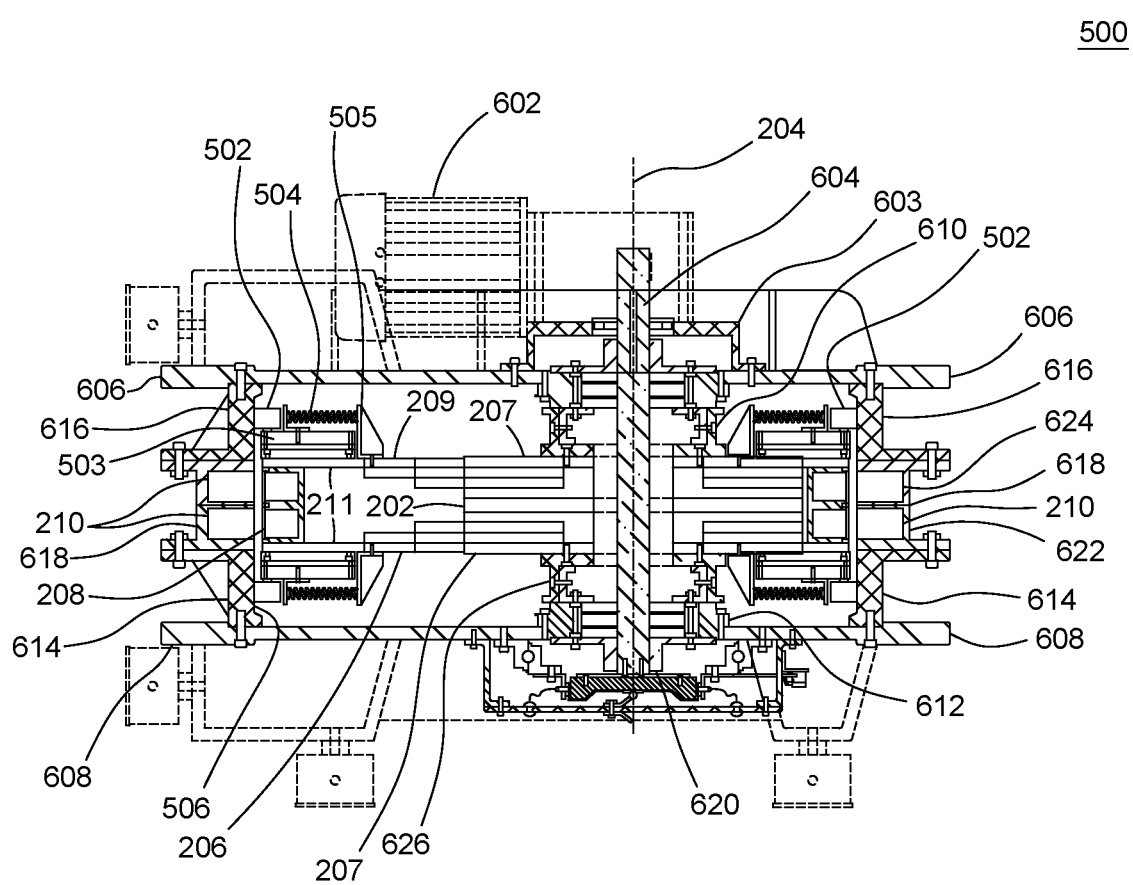
FIG. 6 is a first side cut-away view of a device for generating differential centripetal forces, in accordance with some embodiments.
Figure 7:
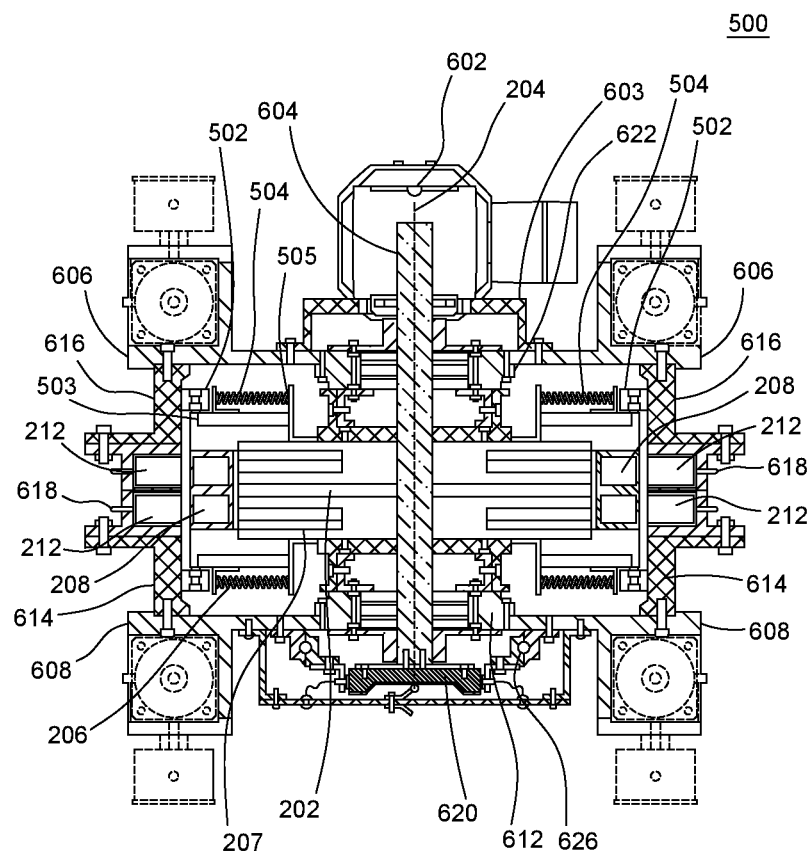
FIG. 7 is a second side cut-away view of a device for generating differential centripetal forces, in accordance with some embodiments.

FIG. 5 is an overhead plan view of an apparatus 500 for generating differential centripetal forces, in accordance with some embodiments. The apparatus is substantially similar to, and can be the same as that shown in FIG. 2 with additional features being shown here. FIG. 6 shows a side cut-away view of the apparatus 500 taken along line A-A, and FIG. 7 shows a side-cut-away view of the apparatus 500 taken along line B-B. As can be seen in FIGS. 6-7 the apparatus 500 includes upper and lower elements in a stacked relationship. That is, for example, where in FIG. 5 there is a spoke element 206 shown, as can be seen upper and lower identical elements in a mirror image relationship.

At the distal end of the distal section, in addition to the permanent magnet 208, there is a roller 502 that bears against a wall 506 or track around the eccentric path. The roller 502 is mounted on a linear bearing 503 that slides against another linear bearing mounted in the distal section 211 of the spoke element 206. The roller 502 and linear bearing 503 are coupled to a spring 504 that is mounted to a fixed bracket 505 on the intermediate section 209. The roller 502 and spring 504 mitigate vibration as the permanent magnet 208 of the spoke element 206 passes by the discrete magnetic elements 210, 212 during rotation. The shape of the permanent magnets 208 along the outer face (facing outward from the axis of rotation 204) is convex or arcuate to further mitigate vibration and allow clearance in the transition sections (e.g. 310, 314) of the eccentric path. The rollers 502 can also assist in directing the permanent magnets if the magnetic elements 210, 212 fail, or if the angular velocity of the turntable 202 is not in an optimum range. Further, it can be seen that there are wires 508 to power/activate the electromagnets 212.

In FIGS. 6-7 two side cut-away views are shown. FIG. 6 shows the apparatus 500 when viewed along line A-A, and FIG. 7 shows the apparatus 500 when viewed along the line B-B. Thus in FIG. 6 the spoke elements 206 are shown fully extended and one fully collapsed being at the +90° and −90° positions, respectively. There is a top set of spoke elements and a bottom set of spoke elements that can be aligned, as shown here, or offset. In FIG. 7 both of the spoke elements 206 are shown fully collapsed as they are at the 0° and 180° positions. A motor 602 is provided on a mount 603 and drives a driveshaft 604 having an axis that defines the axis of rotation 204. The driveshaft 604 is coupled to the turntable 202, directly or indirectly, to rotate the turntable and the spoke elements, accordingly. The mount 603 is mounted on an upper frame member 606 that can cover the top of the apparatus 500 and forms an upper structural portion. Around an outside periphery of the upper frame member 606 an upper sidewall section 616 is attached, such as with bolts. The upper sidewall section is mounted on top of a middle sidewall section 618 in which the magnetic elements 210, 212 are disposed. The middle sidewall section 618 is in turn mounted on top of a lower sidewall section 614, which is mounted on a lower frame member 608 which extends horizontally across a bottom of the apparatus 500 and can be further mounted onto a fixture.

The turntable 202 is coupled to the fixed sections 207 of each spoke element 206. The turntable 202 divides the upper portion from the lower portion of the apparatus 500. Both the upper portion above the turntable 202 and the lower portion below the turntable 202 have a plurality of spoke elements 206 that have a permanent magnet 208 on their distal ends, and a plurality of magnetic elements 210, 212 arranged around an eccentric path around the axis of rotation 204. In the present example, the spoke elements in the upper and lower portions are identical in number, correspond (vertically) in location, and have the same dimensions. Accordingly, the spoke elements 206 of the upper and lower portions are arranges in a mirror image configuration, with respect to each, other above and below the turntable 202.

The middle sidewall section 616 holds upper and lower sets of magnetic elements 210, 212 which are arranged to be at the same height as the permanent magnets 208 of the respective upper and lower spoke elements 206. The rollers 502 rest against the inner vertical wall of the upper and lower sidewall sections 616, 614, respectively.

The fixed sections 207 of the spoke elements 206, in addition to being coupled to the turntable 202, are also coupled on their opposite side to a bearing interface member; the spoke elements 206 in the upper portion are coupled to an upper bearing interface member 622, and the spoke elements 206 in the lower portion are coupled to a lower bearing interface member 626. The upper bearing interface member 622 is further coupled to an upper turntable bearing 610 which is coupled to the upper frame member 606. The drive shaft 604 passes through the center of the upper turntable bearing 610. Likewise, the lower bearing interface member 626 is further coupled to a lower turntable bearing 612, which further coupled to the lower frame member 608. The upper and lower turntable bearings 610, 612 have two portions that rotate with respect to each other, and a roller bearing interface between those two portions, as is well known.

Figure 8:
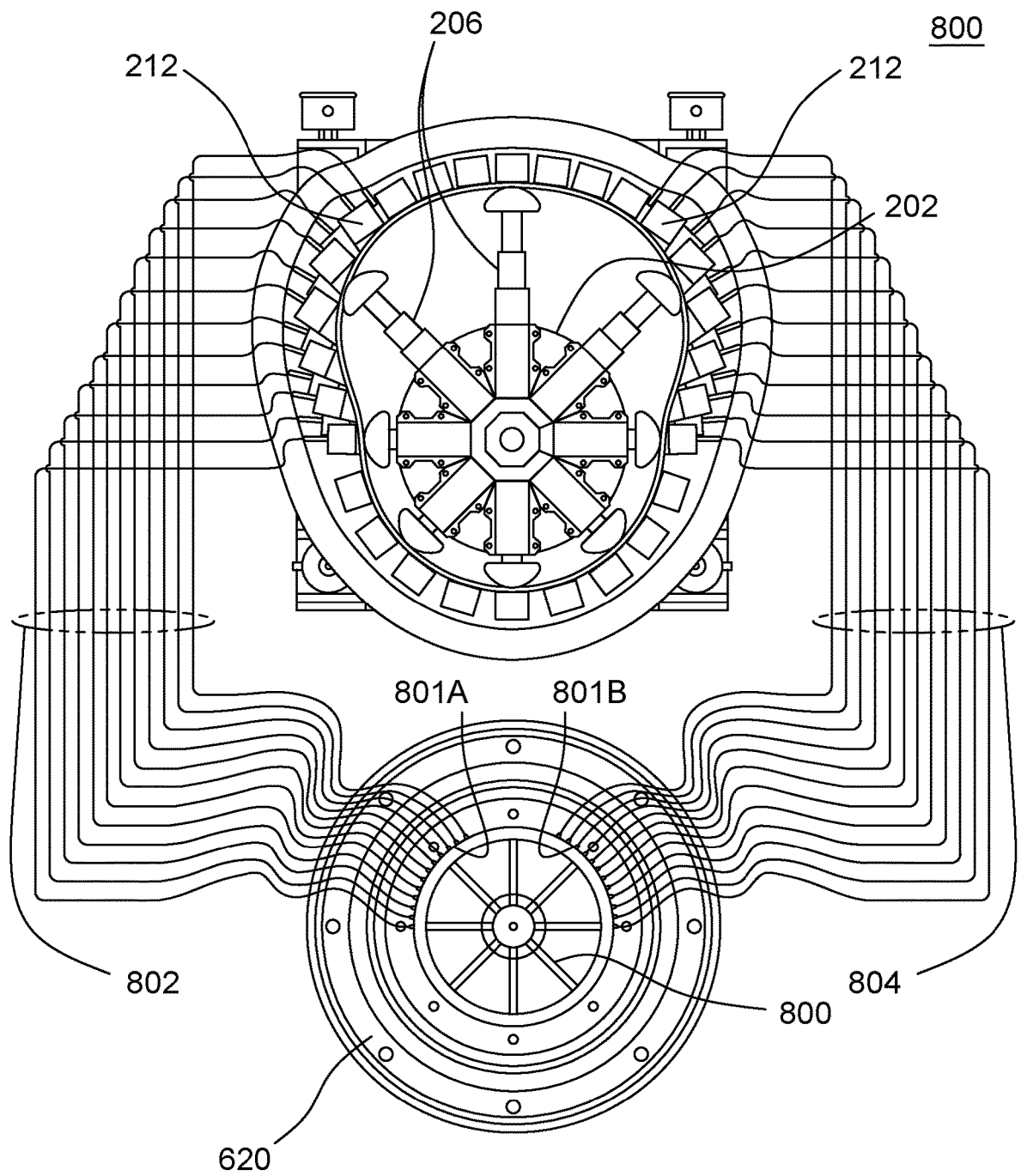
FIG. 8 shows a distributor for selectively energizing electromagnets in conjunction with the movement of masses along the eccentric path for countering the centripetal force, in accordance with some embodiments.

The drive shaft 604 extends through the turntable assembly, through the lower turntable bearing 612, to a distributor 620, to turn an electrode element the distributes current to each of the electromagnets 212 in turn. Thus, there is an electrode for each set (upper and lower) of spoke elements 206 that turns with the spoke elements and makes contact with each of a series of electrode, in series, each of which are connected to one of the electromagnets 212. FIG. 8 shows a distributor 620 for selectively energizing electromagnets 212 in conjunction with the movement of masses along the eccentric path for countering the centripetal force of those masses, in accordance with some embodiments. In the view 800, the distributor 620 is shown removed from under the turntable 202 in order to show the distributor 620 more clearly. As there are eight spoke elements 206, the electrode 800 has eight arms, each one corresponding to one of the spoke elements 206 (or upper and lower spoke element pair). Around the electrode 800 are two contact sets 801A and 801B having individual contact wipers, each corresponding to one of the electromagnets 212 and connected to its corresponding electromagnet by a wire in wire groups 802, 804. As each electrode arm passes by a contact wiper, the distal tip of the electrode arm makes contact with the contact wiper to momentarily complete a circuit and provide current to the corresponding electromagnet 212.

Electromagnets 212 are used in the transition sections 310, 314 to vary the strength of the magnetic field as each of the permanent magnet masses 208 pass by each respective electromagnet 212 as these masses 208 are moving along a non-perfect tangential path as in the arcuate section 312 or the semicircle 302 of the third and fourth quadrants defined in FIG. 3. That is, in regions 302 and 312 the masses 208 move mostly tangentially with respect to the permanent magnets 210 as the masses 208 have a constant radius with respect to the center 204, but in the transition sections 310, 314 the radius of the masses 208 with respect to the center 204 is changing. As a mass 208 moves toward one of the electromagnets 212, then, a half-sinusoidal current or rectangular pulse is applied to the electromagnet 212 to create a magnetic field having a flux magnitude in time to account for the non-tangential movement of a mass 208 as it has been found that a static magnetic field at the locations of the electromagnets 212 produces more vibration in masses 208 as they move past the electromagnets 212. The current pulses provided to each electromagnet 212 are timed to peak when a mass 208 is directly aligned (centered) with the electromagnet 212.

Thus, electromagnets are used in the transition sections because permanent magnets have a permanent magnetic field with a constant flux magnitude. As such, if permanent magnets were to be used on the frame in the transition sections, the magnetic field of the frame magnets 210 and the rotational mass magnets 208 would interact with each other. This interaction would cancel the net gains due to centripetal force differential between the regions above and below the x-axis created by the different distances from the rotational axis. The magnetic field generated by the electromagnets will only be activated when the rotational mass magnet is facing (or perpendicular) the electromagnet and it will be turned off once the rotating mass magnet is not facing (or perpendicular) to the electromagnet. This arrangement eliminates the canceling forces thus generating a net gain.

Figure 11:
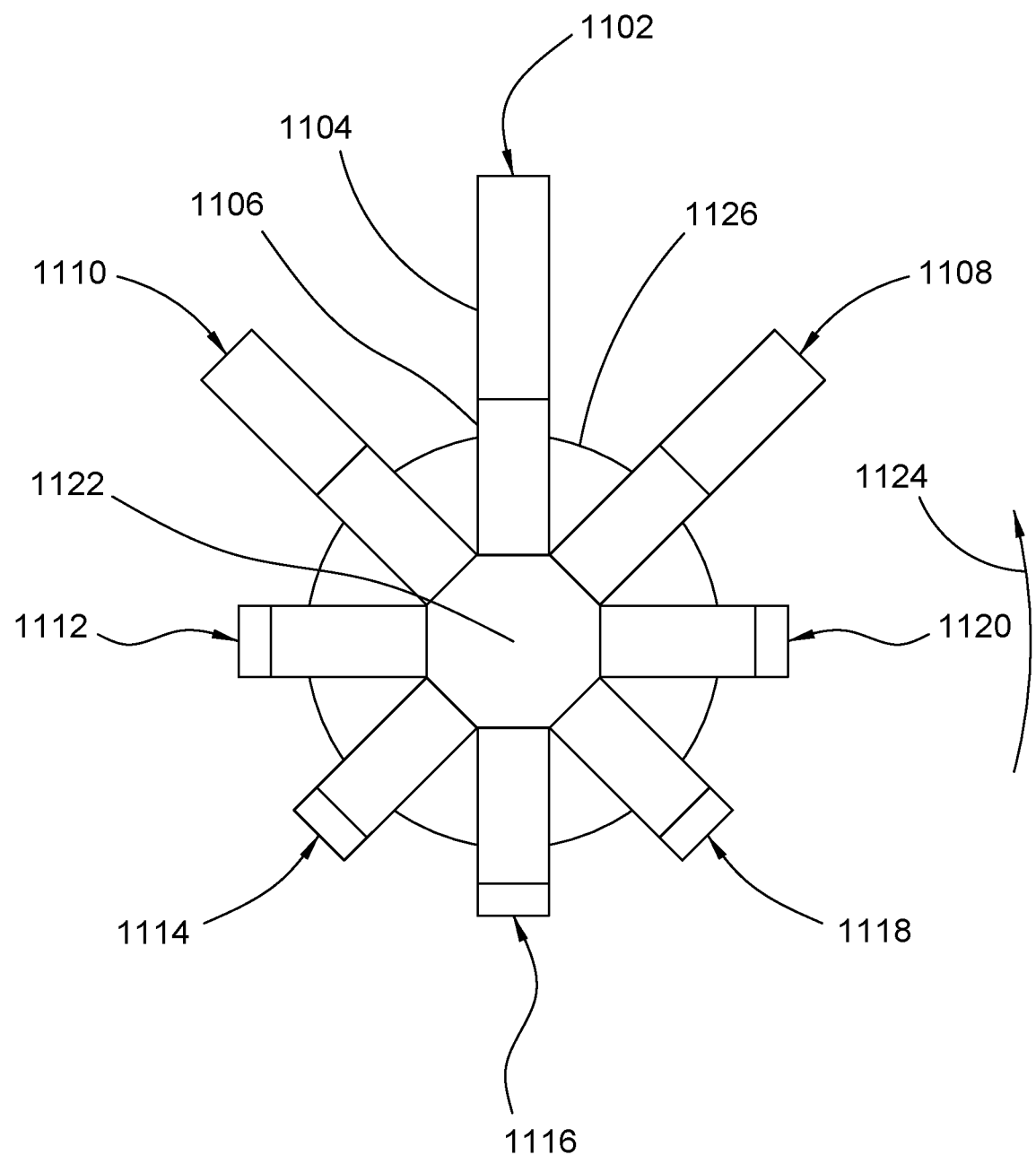
FIG. 11 shows an overhead plan view of a centripetal force differential system using spoke elements that control their own length, in accordance with some embodiments.

FIG. 11 shows an overhead plan view of a centripetal force differential system 1100 using spoke elements that control their own length, in accordance with some embodiments. That is, rather than using magnetic elements disposed on a frame around turntable 1126 at the level of the spoke elements to control their length, where the free end of the spoke elements move freely, it is contemplated that self-adjusting spoke elements, such as linear thrusters, can be equivalently employed. Here the spoke elements 1102, 1108, 1110, 1112, 1114, 1116, 1118, and 1120 are all linear thrusters which have base 1106 and a linear moving portion 1104 that moves in a straight line. The moving portion of each spoke element 1102, 1108, 1110, 1112, 1114, 1116, 1118, and 1120 is controlled by a motor mounted in the base that is operable to move the moving portion between a first position (e.g. a minimum distance or minimum extension) and a second position (e.g. a maximum distance or extension). The spoke elements 1102, 1108, 1110, 1112, 1114, 1116, 1118, and 1120 are arranged such the moving portion of each one moves along a radial line that extends from the center 1122. As the turntable 1126 turns (i.e. in the direction of arrow 1124), each of the spoke elements 1102, 1108, 1110, 1112, 1114, 1116, 1118, and 1120 control the extension of their respective moving portion between a minimum distance position and a maximum distance position. As shown here, spoke elements 1112, 1114, 1116, 1118, and 1120 are in the minimum distance region, so the moving portion (e.g. free end) of each of these spoke elements is withdraw to the same minimum distance or minimum extension. Spoke element 1102 is in the maximum distance region and is at full extension. Spoke elements 1108 and 1110 are in the first and second transition regions, respectively. Thus, spoke element 1108 is extending its moving portion outward from the minimum distance position, when it was at the position occupied by spoke element 1120, to the maximum distance position. Likewise, spoke element 1110 is withdrawing its moving portion from the maximum to the minimum position so that it will be at the minimum position when it arrives at the point of rotation where spoke element 1112 is shown presently.

Figure 12A:
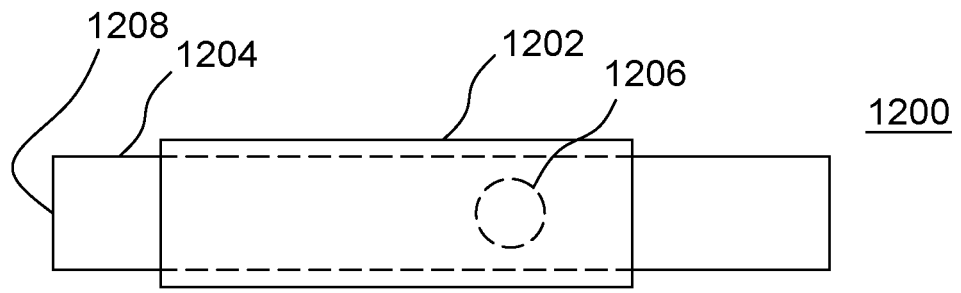
FIGS. 12A and 12B show a linear thruster in minimum and maximum extension states for use as spoke elements, in accordance with some embodiments.
Figure 12B:
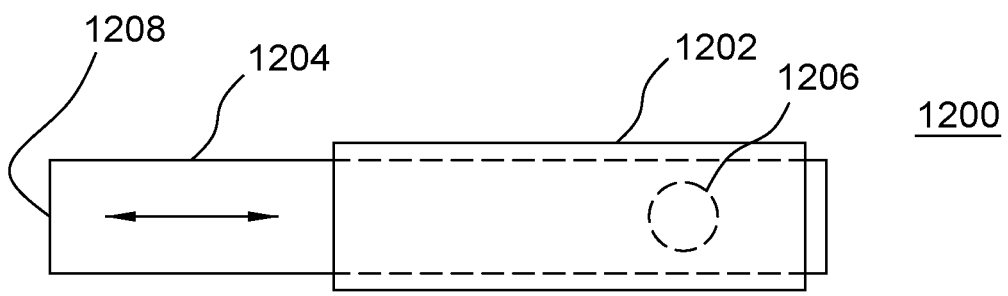

FIGS. 12A and 12B show a linear thruster 1200 in minimum and maximum extension states, respectively, for use as spoke elements, in accordance with some embodiments. The linear thruster 1200 includes a base 1202 that can be mounted to a structure, such as a turntable, and a moving portion 1204 having a free end 1208. The moving portion moves within the base 1202 in a linear manner and can be on tracks or other guide structure in the base 1202. A motor 1206 is used to impart movement to the moving portion 1204, such as by a sprocket that engages a toothed track in the liner portion 1204 such that rotation of the sprocket is converted to linear movement of the moving portion 1204. An example of a linear thruster 1200 can be those made by the ALLEN-BRADLEY company and sold under the name LDAT SERIES INTEGRATED LINEAR THRUSTER. In FIG. 12A the linear thruster 1200 is shown in the withdrawn, or minimum distance configuration, and in FIG. 12B the linear thruster 1200 is in the extended position. That is, the moving portion 1204 is fully extended, or at least at a maximum extension for a given application. A plurality of linear thrusters 1200 can be arranged as spoke elements as shown in FIG. 11, and controlled to extend/withdraw the moving portions based on their location through a rotation so that the free end of each linear thruster follows the eccentric path of FIG. 3.

Accordingly, the use of linear thrusters can achieve a similar result to that of using magnetic elements and permanent magnet masses on the spoke elements, as in FIG. 1. Electric linear thrust motors can replace the telescoping spoke elements of FIG. 1 and have a dead weight at the free end of the actuating arm. In such an arrangement the electric linear thrust motors motor can be arranged in the same way as the spokes of the system using magnets. The electric linear thrust motors can be computer controlled such their free end follows an eccentric path as in the magnetic system. In such a system all the forces would be transmitted to the rotating turn table. A ring torque motor can be used in this system, allowing for the space necessary to install a slip ring at the center axis of rotation. The slip ring can be used to transmit the power and data necessary to operate the electric linear thrust motors. The advantages of this system are that a specially designed electric thrust motor can be used to generate electricity while the motors are in the transitional quadrant (i.e. the first transition region) exerting an outward force, and consume electricity in the quadrant requiring the mass to be pull toward the rotating axis (i.e. in the second transition region). This system would only the require the power necessary for rotation which in theory would be zero minus electrical and mechanical losses.

Thus the disclosed system, apparatus, and method can be used to create a relative force offset that is based on differences in centripetal force to demonstrate how such differences affect the system, and how they can be used. The difference in centripetal force is evident and measurable in part of the system, and the educational value in the system is in demonstrating the net effect of forces.

The claims appended hereto are meant to cover all modifications and changes within the scope and spirit of the present invention.

What is claimed is:

1. A system for creating a centripetal force differential, comprising:
    a turntable defining a plane and having a center, wherein the turntable rotates about the center such than an axis of rotation passing through the center is normal to the plane defined by the turntable;
    a plurality of spoke elements arranged on the turntable radially and symmetrically around the axis of rotation, each one of the plurality of spoke elements having a fixed end adjacent the center of the turntable and a free end opposite the fixed end, wherein the free end is moveable between a minimum radial distance and a maximum radial distance,
    wherein, a region around the turntable is defined into:
        a minimum radial distance region where the free end of each one of the plurality of spoke elements is controlled to be at the minimum radial distance as the spoke element passes through the minimum radial distance region;
        a maximum radial distance region that is opposite the minimum radial distance region relative to the center of the turntable and where the free end of each one of the plurality of spoke elements is controlled to be at the maximum radial distance as the spoke element passes through the maximum radial distance region;
        a first transition region between minimum radial distance region and the maximum radial distance region on a first side where the free end of each one of the plurality of spoke elements is controlled to transition from the minimum radial distance to the maximum radial distance as the spoke element passes through the first transition region;
        a second transition region between the minimum radial distance region and the maximum radial distance region on a second side where the free end of each one of the plurality of spoke elements is controlled to transition from the maximum radial distance to the minimum radial distance as the spoke element passes through the first transition region and immediately after passing through the maximum radial distance region; and
    a motor connected to the turntable on the axis of rotation that is configured to rotate the turntable and the plurality of spoke elements, wherein each spoke element is operable to adjust its length as it rotates through the minimum radial distance region, first transition region, maximum radial distance region, and second transition region with each rotation of the turntable.

2. The system of claim 1, further comprising:
    a plurality of magnetic elements disposed on a frame about the minimum radial distance region, maximum radial distance region, first transition region and second transition region; and
    each one of the plurality of spoke elements includes a permanent magnet at the free end, and wherein a magnetic field of the permanent magnet opposes a magnetic field of each of the magnetic elements such that a magnetic repulsion between the permanent magnet at the free end of each one of the plurality of spoke elements is selected to control the length of each one of the plurality of spoke elements.

3. The system of claim 2, wherein:
    the magnetic elements in the minimal radial distance region and the maximum radial distance region are permanent magnets; and
    the magnetic elements in the first transition region and the second transition region are electromagnets, the system further including a distributor that provides current pulses to each of the electromagnets in synchronization with the rotation of the turntable.

4. The system of claim 1, wherein each of the plurality of spoke elements includes a linear thruster that is operated to move a free end of the spoke element as the turntable rotates.

5. The system of claim 1, wherein the plurality of spoke elements includes a top set of spoke elements on a top of the turntable, and a bottom set of spoke elements on a bottom of the turntable.

6. The system of claim 1, wherein the plurality of spoke elements comprises four pairs of opposing spoke elements.

7. The system of claim 1, wherein each one of the plurality of spoke elements includes, at the free end, a roller that engages a frame edge of a frame around the turntable.

8. The system of claim 7, wherein the roller is mounted on a spring coupled to the spoke element.

9. The system of claim 1, wherein each one of the plurality of spoke elements is a telescoping spoke element having a plurality of telescoping sections.

10. The system of claim 1, further comprising a frame around the turntable, the frame having an upper frame member, a lower frame member, and a middle sidewall section between the upper and lower frame members, the turntable being mounted between the upper and lower frame members.

11. An apparatus for creating a relative centripetal force differential, comprising:
   a turntable that rotates in a plane about a center of the turntable,
   a plurality of spoke elements mounted on the turntable, the plurality of spoke elements arranged in opposing pairs about the center of the turntable, each one of the plurality of spoke elements having a fixed end adjacent the center of the turntable and a free end opposite the fixed end along a radial line from the center of the turntable, wherein the free end is moveable relative to the fixed end along the radial line between at least a minimum distance and a maximum distance;
   a motor coupled to the turntable to rotate the turntable;
   wherein as the turntable is rotated, a length of each one of the plurality of spoke elements is controlled to be:
      at the minimum distance while passing through a minimum distance region about the turntable, wherein the minimum distance region is defined over approximately one hundred and eighty degrees of a rotation of the turntable in a region about the turntable;
      at the maximum distance while passing through a maximum distance region that is directly opposite the minimum distance region and which is defined over about sixty degrees of rotation;
      increasing from the minimum distance to the maximum distance through a first transition region defined over about sixty degrees of rotation between the minimum distance region and the maximum distance region on a first side of the turntable; and
      decreasing from the maximum distance to the minimum distance through a second transition region defined over about sixty degrees of rotation between the maximum distance region and the minimum distance region on a second side of the turntable.

12. The apparatus of claim 11, further comprising:
   a plurality of magnetic elements disposed on a frame about the minimum distance region, maximum distance region, first transition region and second transition region; and
   each one of the plurality of spoke elements includes a permanent magnet at the free end, and wherein a magnetic field of the permanent magnet opposes a magnetic field of each of the magnetic elements such that a magnetic repulsion between the permanent magnet at the free end of each one of the plurality of spoke elements is selected to control the length of each one of the plurality of spoke elements.

13. The apparatus of claim 12, wherein:
   the magnetic elements in the minimal distance region and the maximum distance region are permanent magnets; and
   the magnetic elements in the first transition region and the second transition region are electromagnets, the apparatus further including a distributor that provides current pulses to each of the electromagnets in synchronization with the rotation of the turntable.

14. The apparatus of claim 11, wherein each of the spoke elements include a linear thruster that is operated to move a free end of the spoke element as the turntable rotates.

15. The apparatus of claim 11, wherein the plurality of spoke elements includes a top set of spoke elements on a top of the turntable, and a bottom set of spoke elements on a bottom of the turntable.

16. The apparatus of claim 11, wherein the plurality of spoke elements comprises four pairs of opposing spoke elements.

17. The apparatus of claim 11, wherein each one of the plurality of spoke elements includes, at the free end, a roller that engages a frame edge of a frame around the turntable.

18. The apparatus of claim 17, wherein the roller is mounted on a spring coupled to the spoke element.

19. The apparatus of claim 11, wherein each one of the plurality of spoke elements is a telescoping spoke element having a plurality of telescoping sections.

20. A method of creating a centripetal force differential, comprising:
   providing a turntable that is able to rotate about a center, a plurality of spoke elements mounted on the turntable that are arranged in opposing pairs about the center, each one of the plurality of spoke elements being telescoping and having a fixed end mounted on the turntable adjacent the center, and a free end opposite the fixed end along a radial line from the center and moveable between a minimum distance and a maximum distance;
   defining around the turntable a plurality of region of rotation about the center including a minimum distance region defined over approximately one hundred eighty degrees around the center, a maximum distance region directly opposite the minimum distance region and defined over approximately sixty degrees about the center, a first transition region defined over approximately sixty degrees between the minimum distance region and the maximum distance region on a first side of the minimum and maximum distance regions, and a second transition region defined over approximately sixty degrees between the maximum distance region and the minimum distance region on a second side of the minimum and maximum distance regions;
   rotating the turntable; and
   while rotating the turntable, controlling each one of the plurality of spoke elements such the free end of each one of the plurality of spoke elements is:
      at the minimum distance as the spoke element rotates through the minimum distance region;
      increased from the minimum distance to the maximum distance as the spoke element rotates through the first transition region;
      at the maximum distance as the spoke element rotates through the maximum distance region; and
      decreased from the maximum distance to the minimum distance as the spoke element rotates through the second transition region.

* * * * *